United States Patent Office.

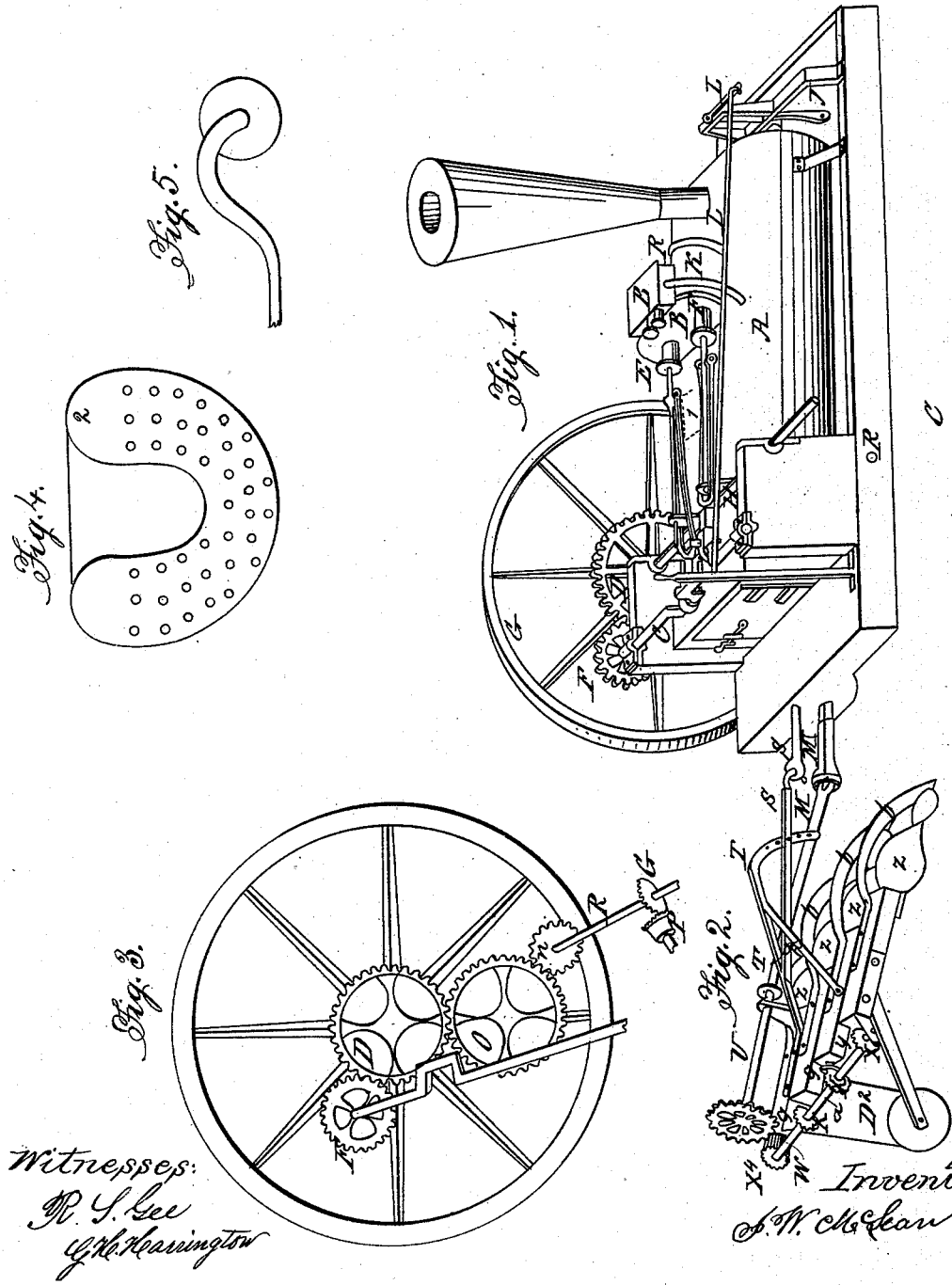

JAS. W. McLEAN, OF INDIANAPOLIS, INDIANA, ASSIGNOR TO HIMSELF AND EDWIN MAY, OF SAME PLACE.

IMPROVEMENT IN STEAM-PLOWS.

Specification forming part of Letters Patent No. 26,397, dated December 6, 1859.

*To all whom it may concern:*

Be it known that I, JAMES W. MCLEAN, of the city of Indianapolis, Marion county, and State of Indiana, have invented a new Improvement in Steam-Plows and Portable Engines; and I do hereby declare that the following is a full, clear, and exact description thereof, reference being had to the accompanying drawings, and to the letters of reference marked thereon, in which—

Figure 1 represents a perspective view of the engine; Fig. 2, a perspective of the plows as being attached to the engine; Fig. 3, a view of the bearing-wheel with the gearing attached; and Fig. 4, the end view of the boiler, showing the depression therein.

A represents the boiler; B, the steam-cylinder; I, the depression in the boiler, in which the water is first heated.

C represents a double crank. E E are pistons. F, D, O, and N(3) are gearing-wheels. G G are bearing-wheels supporting the weight of the machinery; H, the axle of the bearing-wheel. J is a guide-wheel; L L, lever and crank operating the guide-wheel. K K are steam-pipes.

P is a pinion upon the universal shaft M, gearing with the pinion Q upon the shaft R, which, being connected with the shaft U, upon which is the wheel V, gearing with the pinion W, gives motion to the rotary plows Z Z Z Z.

X X X X are pinions upon the shaft $a$. Y Y Y Y are pinions attached to the axles of the rotary plows Z Z Z Z.

$D^2$ is a roller, designed to accomplish several objects—viz., to bear the weight of the plow and carry the gearing thereof, equalize the surface of the ground, and cover the seed as deposited.

S S are connecting-rods. T T are guides governing the depth of the plowing.

$b\ b\ b\ b$ are cutters separating the sod into furrows, so that it will be easily turned by the plows; and Fig. 5 represents the shape of the cutters that are designed to be used in rough ground to protect the points of the plows by raising them out of the ground, and carrying them over stones and other hidden objects.

The nature of my invention and the manner of operating the machine are as follows: The steam-pipes K K conduct the steam from the boiler A to the cylinders B B, where it comes in contact with and operates the pistons E E. To the shaft C is attached the wheel F, gearing with the wheel D, and that, with the wheel O, which gears with the pinion $n$ upon the shaft R, giving motion to the wheels D and O, the wheel D being fastened to the bearing-wheel G. The wheels F and O are attached to the shafts R and H, communicating motion to the plowing arrangement by the shafts M and U. Upon the shaft U is attached pinion P, gearing with the pinion Q upon the shaft R, giving motion to the machinery by being geared with the wheels F, D, O, and N. The wheel V upon the shaft U gears with the pinion W, that also gearing with the pinion $X^4$, which is upon the shaft $a$, the pinions X X X X upon the shaft $a$ gearing with the pinions Y Y Y Y upon the shafts X X X X, which propel the plows Z Z Z Z.

One great disadvantage heretofore experienced in the construction and management of portable engines has been caused by the necessity of carrying a large supply of water to generate a sufficient quantity of steam to perform the functions required to overcome the resistance presented by the unevennesss of the ground. In order to accomplish this, large receivers containing the water before it was admitted into the boiler had to be used; but by the use of this boiler this cumbersome burden is removed, the same object being accomplished by the depression I, as shown in Fig. 4, by which depression several barrels of water can be kept for the use of the engine without any apparent inconvenience, which is heated by the radiation of heat from the boiler A and the exhausting of steam into this receiver, as shown in the top of the boiler, Fig. 1.

There is another advantage to be derived from the use of this boiler, from a principle not shown in the drawings. In land engines a great difficulty is experienced in passing over rough ground or on the sides of hills by the rushing of water to one side of the boiler, leaving the other exposed to an intense heat, which not only injures it, but greatly favors the explosion thereof; but by the use of this boiler, Fig. 4, this difficulty is entirely overcome, for it is evident that in passing over hills or traveling on the sides thereof the pressure of the steam in that part of the boiler marked 1 and 3 will prevent the water from passing thereto. Consequently the water almost at all times retains its height in both sides of the boiler. Consequently it cannot be placed in any position, except being turned upside down, by which any part thereof might be exposed to any heat whereby it might be injured unless deficient of water. Hence the utility and safety thereof.

The self-adjusting coupler, by which the plow and engine are connected, overcomes another difficulty which hitherto has greatly militated against the success of steam-plowing, as heretofore much inconvenience has been experienced in backing up of the engine in order to plow in the corners of the field; but by this coupling arrangement the engine can be gradually turned, and the plows, having a tendency to move in a straight line, will do so until they are hauled in by the force of the engine; but their course is kept so nearly forward that but a small portion of the ground in the corners of the field remains unbroken. It also yields to the unevenness of the ground by the same arrangement.

I do not expect to claim the principle of breaking up and disintegrating the soil by means of rotary plows, as that has been granted to others. Neither do I claim anything new or novel in the construction of the engine or in its application to steam-plows; but

What I claim, and desire to secure by Letters Patent, is—

The arrangement of the plows Z, gearing V W X, cutters $b$, lever T, and connecting-rod S, in combination with the universal-jointed shafts U M M, when operated in connection with a steam-engine, substantially as set forth.

J. W. McLEAN.

Witnesses:
R. S. LEE,
G. H. HARRINGTON.